Nov. 23, 1937. A. V. SPINOSA 2,099,709
PLASTER BASE
Filed May 5, 1934 4 Sheets-Sheet 3

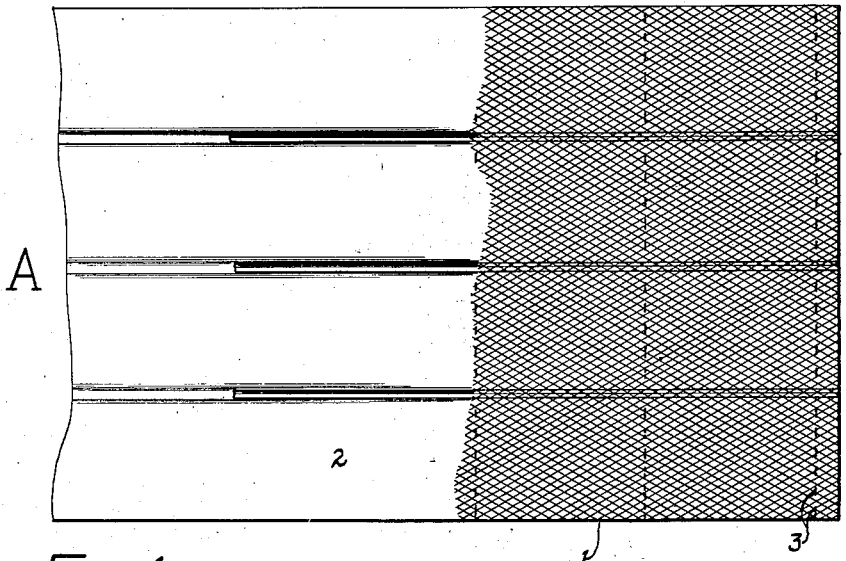
Fig.1.
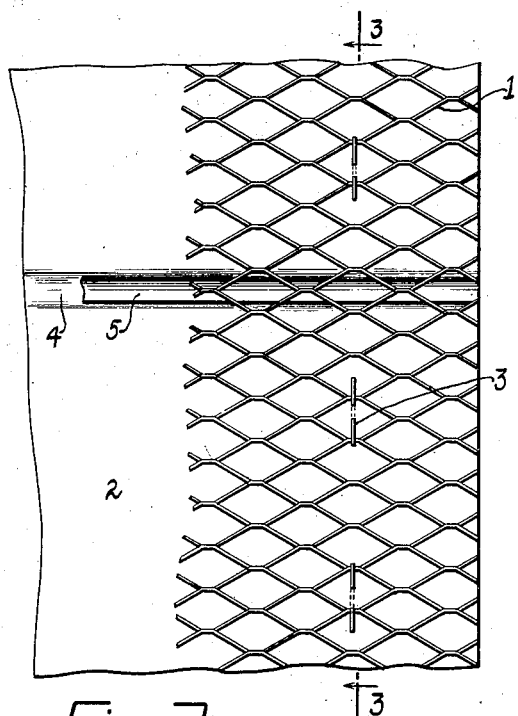
Fig.2.
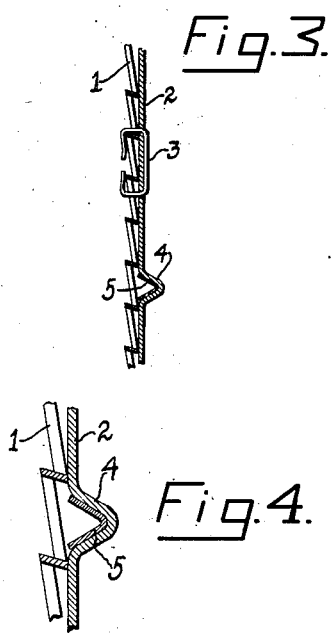
Fig.3.
Fig.4.

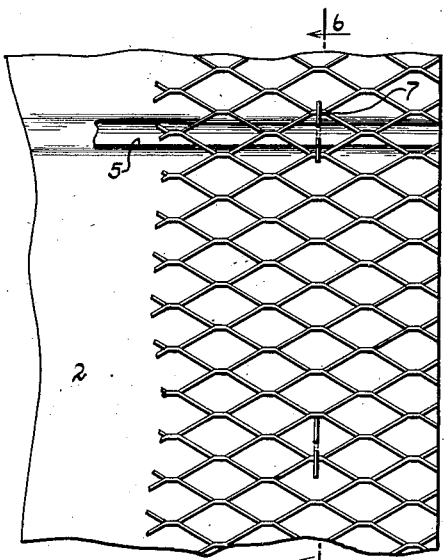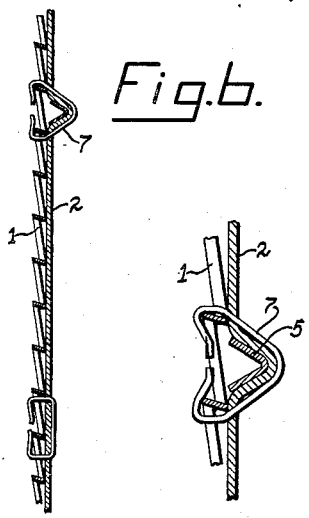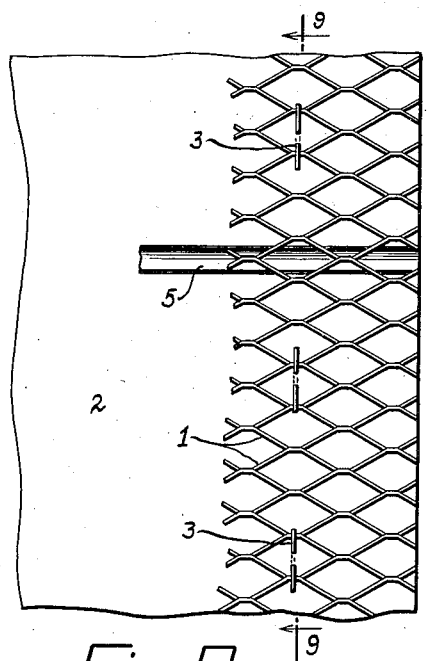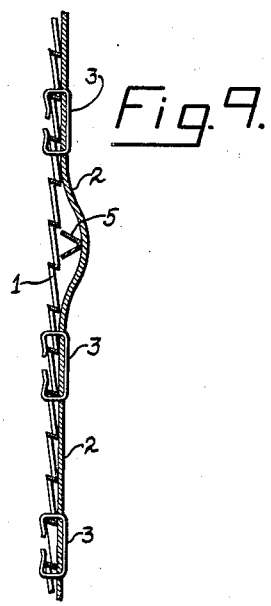

INVENTOR
Arthur V. Spinosa
BY
Symmestvedt + Lechner
ATTORNEYS

Nov. 23, 1937.    A. V. SPINOSA    2,099,709
PLASTER BASE
Filed May 5, 1934    4 Sheets-Sheet 4

INVENTOR
Arthur V. Spinosa
BY
Symmestvedt + Lechner
ATTORNEYS

Patented Nov. 23, 1937

2,099,709

UNITED STATES PATENT OFFICE 2,099,709

PLASTER BASE

Arthur V. Spinosa, Parkersburg, W. Va., assignor to Penn Metal Company, Inc., a corporation of Delaware Application May 5, 1934, Serial No. 724,008

7 Claims. (Cl. 72—116)

This invention relates to plaster bases composed, essentially, of metal lath and paper backing.

According to one aspect of my invention, I desire to provide a ribbed or reinforced base. I am aware that metal lath has heretofore been employed as a part of the plaster base with said lath having ribs formed integrally therewith. In such construction, it has been customary to make different weights of lath to be used with different spacings of studding and channel runners, in walls and ceilings; the greater the spacing, the heavier the lath required. I propose a construction in which the same, and a light weight of lath can be employed for all spacings normally encountered in standard practice. I secure this and other advantages to be hereinafter more fully pointed out, by making the rib members separate and by providing means for securing the parts together in a manner to cause them to function as a homogeneous structure.

According to another aspect of my invention, I propose a construction of plaster base, either with or without ribs, which I can ship without packaging, thus still further reducing costs.

I also aim to provide a ribbed construction of plaster base, employing metal lath as a part thereof, which presents the most effective plastering surface and one free from the formation of lumps or ridges which occur when plastering standard ribbed lath.

The foregoing, together with such other objects and advantages as may hereinafter appear or are incident to my invention, I obtain by means of constructions illustrated in the accompanying drawings, wherein—

Fig. 1 is a fragmentary plan view of a plaster base made in accordance with my invention, certain portions being broken out to more clearly illustrate the parts.

Fig. 2 is a fragmentary plan view drawn on an enlarged scale.

Fig. 3 is a section taken on the line 3—3 of Fig. 2.

Fig. 4 is a cross section through the base at a rib, drawn on an enlarged scale.

Fig. 5 is a view corresponding to Fig. 2 but illustrating a modification of my invention.

Fig. 6 is a section taken on the line 6—6 of Fig. 5.

Fig. 7 is a cross section through the construction of Figs. 5 and 6 at a rib, drawn on an enlarged scale.

Fig. 8 is a view corresponding to Fig. 2 but illustrating still another modification of the invention.

Fig. 9 is a section taken on the line 9—9 of Fig. 8.

Figure 10:
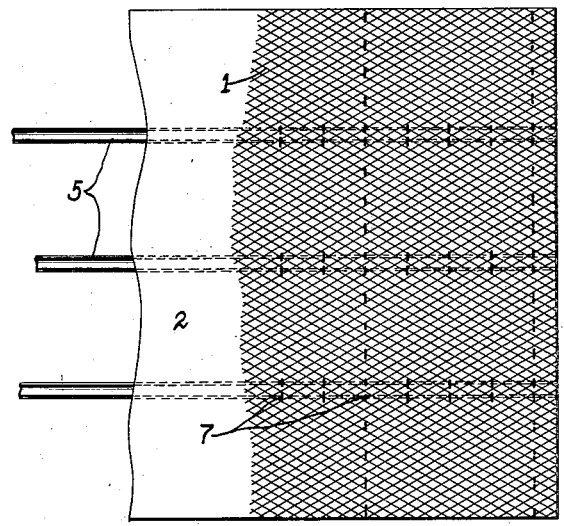
Fig. 10 is a view corresponding to Fig. 1, but of another modification of the invention.

Referring now to Figs. 1 to 4 inclusive, the reference character A indicates the plaster base, considered as a whole. This base includes a sheet of metal lath 1, the lath being of light gauge and of the deployed type with diamonds approximately a half inch long, the weight of the lath being preferably 2.5 pounds per square yard. The lath is of standard size and approximately 27" wide and 96" long, or 24" by 96".

Figure 12:
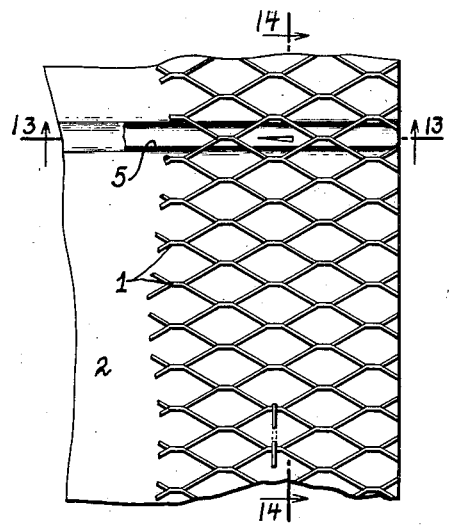
Fig. 12 is a view corresponding to Fig. 2, but of still another modification.
Figure 15:
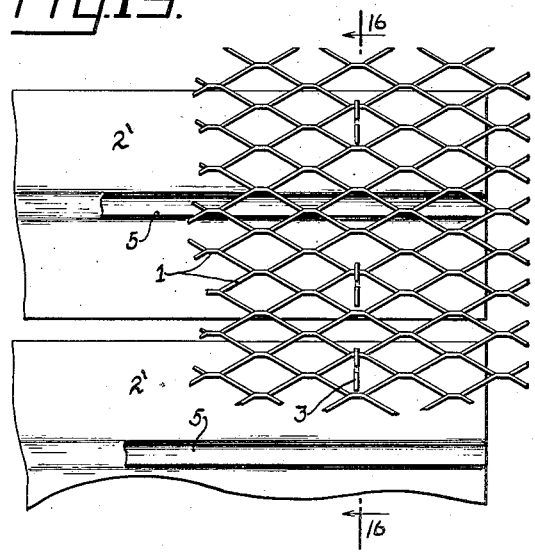
Fig. 15 illustrates a modification in which the metal lath may have marginal portions, unbacked so as to permit of ready overlapping and in which a number of backing strips instead of a single backing sheet, may be employed.

The lath is backed by a paper backing 2, in this instance shown as a single sheet which may be co-extensive with the sheet of lath or of smaller dimension, as indicated in Fig. 15, whereby the marginal portions of the sheet of metal lath are left exposed for lapping. The backing is preferably of first quality wood pulp stock and is ordinarily termed prime kraft board. I prefer to employ a weight of paper from about .8 pound to .9 pound per square yard. This paper is stiff but springy and does not detract from the structural strength of the base, but, if anything, adds thereto. This paper is sufficiently resistant to moisture to maintain its shape, i. e., does not sag. At the same time, it is sufficiently absorbent to cause a good bond between the plaster or mortar. The backing is secured to the lath by means of rows of spaced staples 3 of the type adapted to be applied by a stapling machine. Staples are preferably applied through the backing side for the reason that in metal lath of the type employed, the diamonds are not truly aligned. Notwithstanding this, if the staples be applied from the paper side, at least one of the legs of the staples or clips will engage the metal. Preferably, also, the staples are so inserted that they extend widthwise of the diamond openings of the lath, i. e., parallel to the minor axes of the diamonds, as shown in Figs. 2 and 12. I have found that if, with this arrangement, the effective length of the staple, that is to say, the length between the prongs, is equal approximately to one and one-half times the maximum diamond width, the chances of both prongs of the staple being turned back by direct contact with the metal lath, and of the staple thereby failing to function as intended, are reduced to a minimum; and practical assurance is also had that both of the prongs shall grip or embrace the strands of the lath.

The backing 2 has grooves 4 pressed therein, the number of grooves corresponding to the number of ribs desired.

Interposed between the backing and the metal lath are separate rib members 5, preferably of pressed metal formed into an approximate U or V shape in cross section. The depth of the grooves 4 is preferably slightly less than the depth of the ribs 5, and the rows of staples to either side of a rib are sufficiently close thereto as to cause the springy backing to press the ribs against the lath so that the three parts are secured together by the staples in what may be termed a homogeneous structure, the friction brought about by the pressure holding all of the parts in proper relation. This is of importance in the handling of the bases, particularly when they are being put in place.

The staples of the rows are spaced apart longitudinally of the base from about six to about eight inches apart.

The above base is suitable for application either to inside walls and ceilings, as well as to outside walls for stucco. It is light in weight, and the same weight of metal lath can be employed for all spacings of studding and channel runners normally encountered. In this connection, if the spacings be wide, heavier ribs can be employed, or a greater number of light ribs. Thus only one weight of metal lath is required, which tends to economy in manufacture and cheapness of the product.

It is well recognized that diamond lath of the type described provides the most effective plastering surface. By having the ribs separate and to one face of the metal lath, this effective plastering surface is maintained throughout, which is not the case where the ribs are formed integrally with the lath. With such ribbed lath, the plastering surface presented is not so effective, and the plaster or mortar cannot be applied so quickly or as evenly, the ribs causing ridges or lumps at the ribs. On inspection of Fig. 3, it will be seen that the bent-over portions of the legs or prongs of the staples or clips are pressed inwardly. In fact, I prefer to have all that portion of the clips on the plaster side of the metal lath, depressed below the plane of the outer face of the lath. This is better illustrated on an enlarged scale on Fig. 18, where it will be seen that the strands are crushed down at the clips and the bent-over portions of the prongs of the staples are kinked inwardly as at 6, so that the whole inner end portions of the clips lie approximately below the plane of the outer face of the metal lath. In addition, to securing the springy engagement or attachment of the backing to the lath, this construction has the further advantage that the plaster bases may be bundled one upon the other, without the packaging which would otherwise be required were the legs of the staples not kinked inwardly. When the legs are not kinked inwardly, one base is apt to hook itself on to the next one. This is avoided by my construction.

In the arrangement of Figs. 5 to 7 inclusive, I have provided saddle clips 7 at the ribs, in addition to the staples 3, otherwise the construction is the same as that described. In Figs. 8 and 9, I have shown a construction in which the backing 2 is ungrooved, the ribs 5 being held in place solely by the pressure of the backing, in which connection the adjacent rows of clips 3 may be more closely spaced together than in the construction of Fig. 1.

Figure 11:
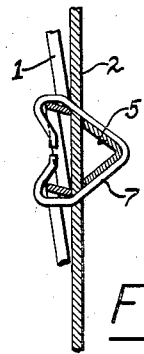
Fig. 11 is an enlarged cross section through the construction of Fig. 10, at a rib.

In the construction of Figs. 10 and 11, the backing 2 is interposed between the lath 1 and the ribs 5, and saddle clips 7 are provided as in Figs. 5 to 7 inclusive. A greater number of saddle clips are required in such construction in order to obtain the desired homogeneous structure.

The constructions of Figs. 1 to 7 inclusive, and of Figs. 10 and 11 do not employ quite as much plaster as the construction of Figs. 8 and 9, in which it will be seen that more plaster goes through the lath at the ribs.

Figure 13:
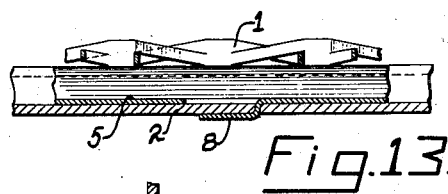
Fig. 13 is a section taken on the line 13—13 of Fig. 12.
Figure 14:
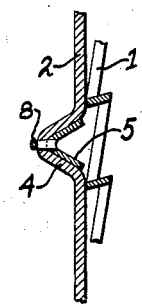
Fig. 14 is a section through the ribbed portion of Fig. 12, on the line 14—14 thereof, but drawn on an enlarged scale.

With respect to the construction of Figs. 12 to 14 inclusive, this is essentially the same as that of Fig. 1 with the exception that tongues are struck from the bottom or base of the ribs 5, these prongs or tongues being adapted to pierce the backing at the base of the grooves 4 to hold the backing to the ribs.

Figure 16:
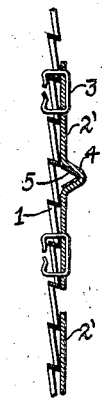
Fig. 16 is a section taken on the line 16—16 of Fig. 15.

The arrangement of Figs. 15 and 16 is the same as that of Fig. 1 with the exception that the backing is in the form of spaced strips 2'. In addition, the construction differs in that the marginal portions of the metal lath are left exposed for lapping, which is an arrangement which may be employed in all forms illustrated.

Figure 17:
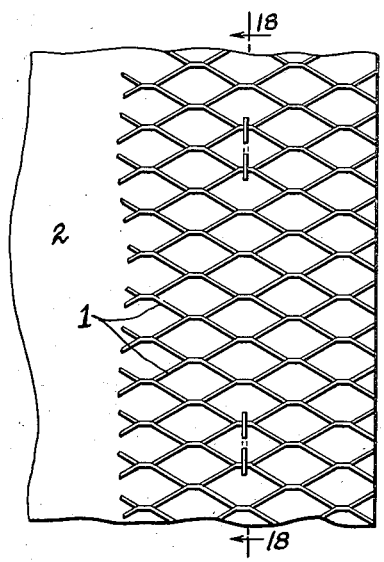
Fig. 17 is a fragmentary plan view corresponding to Fig. 2, illustrating a plaster base of the unribbed type, but otherwise made in accordance with my invention.
Figure 18:
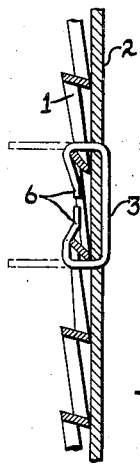
Fig. 18 is an enlarged section taken on the line 18—18 of Fig. 17.

In the arrangement of Figs. 17 and 18, I have shown my invention as applied to an unribbed or unreinforced base.

In all forms, a relatively small amount of plaster is required because the backing while yielding, only springs enough to allow just sufficient mortar to pass through the metal lath to firmly key itself and cover the lath. In all forms, since the paper does not lose its structural characteristic, a further saving is effected because, since the paper does not lose its structural characteristic, a less expensive mix may be used for the first coat, and it is possible to use more water than heretofore. The base is also suitable for two coat work, eliminating the brown coat, and thus reducing plaster costs. When the base is used for floor work, the cinder fill ordinarily employed may be dispensed with, and cement applied, to be used as a base for tile.

When marginal portions of the metal lath are left uncovered, it is easy to locate the position of studding and channels, and if the backing be in strip form, as shown in Fig. 15, attachment of the base is facilitated, this being particularly advantageous in ceiling work.

I claim:

1. A plaster base presenting an unobstructed and substantially uniform plaster-receiving face of metal lath, said base comprising a sheet of said lath having a backing of stiff but springy paper, a reinforcing rib member interposed between said lath and backing, and a plurality of spaced means securing the backing to the lath at points located at opposite sides of said rib member and operative with the stiff backing member to securely bind the reinforcing rib in position against the lath.

2. A plaster base presenting an unobstructed and substantially uniform plaster-receiving face of metal lath, said base comprising a sheet of said lath having a backing sheet of stiff but springy paper bearing flatly against said lath and having a longitudinal groove, a reinforcing rib member confined in said groove between the lath and the backing, and means for securing the backing against the lath at a plurality of spaced points distributed over the surface areas thereof and at opposite sides of the reinforcing rib and operative with the stiff backing member to securely bind the reinforcing rib in position against the lath.

3. A plaster base presenting an unobstructed and substantially uniform plaster-receiving face of metal lath, said base comprising a sheet of said lath having a backing sheet of stiff but springy paper bearing flatly against said lath and having a longitudinal groove, a reinforcing rib member of slightly greater effective thickness than the depth of said groove confined within the latter between the lath and the backing, and means for securing the backing against the lath at a plurality of spaced points distributed over the surface areas thereof, certain of said points being in proximity to said groove to thereby frictionally bind the said rib member in position.

4. A plaster base comprising a sheet of metal lath, a stiff but springy paper backing having a groove therein, a reinforcing rib adapted to be received in said groove, means on the rib engaging and holding the backing, and other means for securing the backing to the lath.

5. A plaster base comprising a sheet of metal lath, a paper backing, and attaching clips of the type adapted to be applied by a stapling machine inserted from the backing side of said base, the bent over leg portions of said clips together with the portions of the lath embraced thereby being depressed below the plane of the outside face of the lath and leaving the latter free from projections.

6. A plaster base comprising a sheet of diamond metal lath of the deployed type having relatively small diamonds, a paper backing member lying flatly against the lath, a separate reinforcing rib member, one of said members being interposed between the lath and the other member, and means for securing said three parts together, said securing means being confined at the lath side of the base substantially within or below the plane of the outer face of the lath and said base presenting an unobstructed and substantially uniform plaster-receiving face of metal lath.

7. A plaster base comprising a sheet of diamond metal lath, a paper backing and attached clips of the type adapted to be applied by a stapling machine inserted from the backing side of said base and securing the backing to the lath, said clips extending widthwise of the diamond openings of the lath and having an effective length equal approximately to one and one-half of the diamond width.

ARTHUR V. SPINOSA.